United States Patent [19]

Miksa et al.

[11] Patent Number: 6,079,917
[45] Date of Patent: Jun. 27, 2000

[54] HORIZONTAL LEVER ACTUATED CHUCK

[75] Inventors: Ronald W. Miksa, Central; Jeremy Grayson, Columbia; Keith Buddendeck, Clemson, all of S.C.

[73] Assignee: Power Tool Holders, Inc., Christiana, Del.

[21] Appl. No.: 09/197,260

[22] Filed: Nov. 20, 1998

[51] Int. Cl.⁷ .................................. B23C 1/20; B23B 5/34
[52] U.S. Cl. .............................. 409/182; 279/50; 279/146
[58] Field of Search ............................... 409/182; 279/43, 279/50, 57, 74, 75, 134, 135, 146

[56] References Cited

U.S. PATENT DOCUMENTS

| | | |
|---|---|---|
| 425,224 | 4/1890 | J. Hartness . |
| 658,473 | 9/1900 | Smith et al. . |
| 1,285,763 | 11/1918 | Markey ................................... 279/146 |
| 1,467,821 | 9/1923 | Tuttle ..................................... 279/146 |
| 1,956,272 | 4/1934 | Church ................................... 279/146 |
| 2,354,966 | 8/1944 | Panza et al. ............................. 279/50 |
| 2,370,729 | 9/1945 | Hoppe . |
| 2,410,344 | 10/1946 | Hines ...................................... 279/50 |
| 2,440,926 | 5/1948 | Bogart .................................... 279/146 |
| 2,466,651 | 4/1949 | Zagar . |
| 2,562,143 | 7/1951 | Godfrey et al. ......................... 409/182 |
| 2,655,826 | 10/1953 | Goldsby . |
| 3,095,205 | 6/1963 | Farnsworth . |
| 3,724,563 | 4/1973 | Wickham et al. . |
| 3,811,361 | 5/1974 | Seely et al. . |
| 4,656,727 | 4/1987 | Itoh ......................................... 279/43 |
| 5,188,492 | 2/1993 | McCracken . |
| 5,743,539 | 4/1998 | Vanderpol et al. . |
| 5,921,730 | 7/1999 | Young et al. ............................ 409/182 |

FOREIGN PATENT DOCUMENTS

| | | | |
|---|---|---|---|
| 680.403 | 4/1930 | France ..................................... 279/43 |

OTHER PUBLICATIONS

U.S. Pat. application entitled "Rotary Power Tool with Remotely Actuated Chuck," USSN 09/196,580, filed Nov. 20, 1998.

U.S. Pat. application entitled "Rotary Power Tool with Hydraulically Actuated Chuck," USSN 09/197,261, filed Nov. 20, 1998.

U.S. Pat. application entitled "Rotary Power Tool with Remotely Actuated Chuck, " USSN 09/067,629, filed Apr. 28, 1998.

*Primary Examiner*—Andrea L. Pitts
*Assistant Examiner*—E. Ergenbright
*Attorney, Agent, or Firm*—Nelson Mullins Riley & Scarborough, L.L.P.

[57] ABSTRACT

A rotary power tool is provided having a remotely actuated chuck device. The chuck includes an outer sleeve member that is axially movable relative to the drive spindle between a gripping and release position. A sleeve actuating device is provided having a first member engaged with the outer sleeve member and which extends generally radially outward from the drive spindle or chuck. The first member is movable in a direction so as to move the outer sleeve member between the gripping position and release position. The sleeve actuating device includes an actuator member configured with the first member to move the first member upon an external force being applied thereto. The actuator member is generally perpendicular to the axis of the drive spindle and may be limited in length to be confined in the perimeter of the casing. In this manner, an operator can move the chuck device between the gripping release positions at a location remote from the chuck device and drive spindle.

13 Claims, 2 Drawing Sheets

HORIZONTAL LEVER ACTUATED CHUCK

BACKGROUND OF THE INVENTION

The present invention relates to a rotary power tool, particularly a router, having a chuck device for holding a tool bit to a drive spindle wherein the chuck device is remotely actuated.

There are a number of well known types of power tools, including routers, wherein a chuck is mounted on the end of a rotatable drive spindle for holding a tool bit to the drive spindle. In many applications of these tools, it is necessary to manually manipulate or engage the chuck in order to change out the tool bit. A number of chuck devices utilize an axially movable outer sleeve member to actuate the chuck. For example, many such chuck devices have an axially movable outer sleeve that moves between a gripping position wherein the chuck grips upon a tool shank inserted into the chuck, and a release position wherein the chuck releases the tool shank inserted therein. Such chuck devices are commonly referred to as "quick-change" chucks. For example, one such chuck is illustrated and described in U.S. Pat. No. 5,810,366. Additional examples of such chucks are illustrated in U.S. Pat. Nos. 4,692,073; 2,807,473 and 3,521, 895. U.S. patent application Ser. No. 09/067,569 describes another type of sleeve actuated chuck.

In certain operating environments, particularly with high speed routers, there is limited space in the critical area of the chuck device and tool bit to actuate the chuck for removal or insertion of the tool bit and the operation of changing out the tool bits can be potentially dangerous. With many conventional tools, the chucks are actuated by an external mechanism, such as a wrench or other tool. There is, however, a trend in the industry to incorporate quick-change chucks with such tools, particularly routers, to eliminate the necessity of external tools for operating the chucks and to take advantage of the obvious benefits of the quick-change chucks. However, the operation of actuating these quick-change chucks may also be cumbersome and potentially dangerous, especially where the operator must insert his hands next to the cutting edges of the tool bit.

The present invention provides an apparatus for remotely actuating a quick-change chuck device on rotary power tools, particularly routers, in a safe and quick manner.

OBJECTS AND SUMMARY OF THE INVENTION

It is, therefore, a principle object of the present invention to provide a power rotary tool incorporating a mechanism for remotely actuating the chuck device.

An additional object of the present invention is to provide a mechanism for safely changing out tool bits in rotary power tools wherein the operator's hands are totally removed from the cutting area of the tool bits.

Still a further object of the present invention is to provide a mechanism for remotely actuating chucks on rotary power tools, particularly fixed base routers, so that actuation of the chuck is no longer limited by manual hand strength.

Additional objects and advantages of the invention will be set forth in part in the following description, or may be obvious from the description, or may be learned through practice of the invention.

In accordance with the object and purposes of the invention, a rotary power tool is provided having a remotely actuated chuck device mounted on the end of a rotatable drive spindle. The power tool includes a casing housing the drive spindle with an end of the spindle extending through the casing and coupled with the chuck device. A chuck actuating device is engaged with the chuck device.

Additionally, there exists a base concentric on the casing. The base is comprised of an upper working surface for establishing a working position of a tool held by the chuck device. The base can be rotatably advanceable on the casing for adjusting the working position of the tool, as with conventional fixed-base routers, or can be a plunge type wherein the base is advanceable on guides that are generally parallel to the axis of the drive spindle.

The chuck device is movable between a gripping position when the chuck clamps upon a tool bit held within the chuck device and a release position when the chuck device releases a tool bit. The present invention is not limited to any particular type of chuck device and, in this regard, the internal working mechanisms of the chuck device are not particularly important to the invention or necessary for an understanding of the invention.

In a preferred embodiment according to the invention, a chuck device comprises an outer sleeve member which is axially movable between a gripping position and a release position where the chuck device releases a tool held therein.

The power tool also includes a sleeve actuating device having a first member that is engaged to the outer sleeve member of the chuck and which extends generally radially outward from the chuck. The first member is movable or pivotable in a direction with an axial component so as to move the outer sleeve member of the chuck axially between the gripping position and the release position. The sleeve actuating device includes an actuator member configured or mechanically engaged with the first member to move the first member upon an external force being applied to the actuator member. The external force may be a manual force, pneumatic force, electric force, hydraulic force, etc. In this manner, upon the external force being applied to the actuator member, the first member causes the chuck to move between the gripping and release positions. Thus, the operator can remotely actuate the chuck while being completely removed from the working area of the tool bit held by the chuck.

In a preferred embodiment of the invention, the actuator member includes a lever arm that is pivotally connected to the first member and extends generally horizontally across the top surface of the tool casing. In one embodiment, the lever arm is generally parallel to the first member and is pivotal or movable in the same plane of movement as that of the first member. In this embodiment, the lever arm is pivotal in a radial direction relative to the drive spindle. In other words, the lever arm pivots towards and away from the casing. This pivotal movement of the lever arm also causes the first member to move or pivot away from or towards the chuck sleeve member with a sufficient axial movement component to actuate the chuck.

In another embodiment of the invention, the actuator member is formed integral with the first member which is connected to a pivot point attached to the casing on a side opposite the side to which an external force is applied. The lever arm is pivotal in a radial direction relative to the drive spindle. This pivotal movement causes the first member to operably move the chuck sleeve member into a locking or release position.

It should be appreciated by one skilled in the art that the present chuck actuating device may be used on fixed base or plunge base routers. If this invention is to be used on a fixed base router, the actuating device should not extend past the inner perimeter of the base. By keeping the device within the inner perimeter of the base, the base may still be moved up and down without any modification to the base. However, if the actuating device extends beyond the inner perimeter of the base, then a helical opening or other modification may be made in the base so that the actuating device may be operated at any position of the base with respect to the housing. If a plunge base router is used in conjunction with this invention, the length of the lever arm is not necessarily dependent on the diameter of the base or housing.

It should be appreciated that the rotary power tool according to the invention can comprise any make or configuration of power tool, for example, drills, lathes, tapping machines, grinders, sanders, etc. in which a rotatable base is mounted to a casing. In a preferred and particularly useful embodiment of the invention, the power rotary tool comprises a router, whereas the chuck device is specifically configured to hold a routing bit to the drive spindle of the router.

The remote actuating mechanism may be incorporated as a component of the power tool or may be an after market retrofit item that can be easily installed on existing rotary power tools. Accordingly, the present invention includes a remote actuating mechanism separate from the rotary power tool or chuck device. Modifications to the casing may be necessary to incorporate the present invention as an aftermarket retrofit.

Preferred embodiments of the present invention will now be discussed in detail with reference to the following figures.

DETAILED DESCRIPTION OF THE PREFERRED EMBODIMENTS

Figure 1:
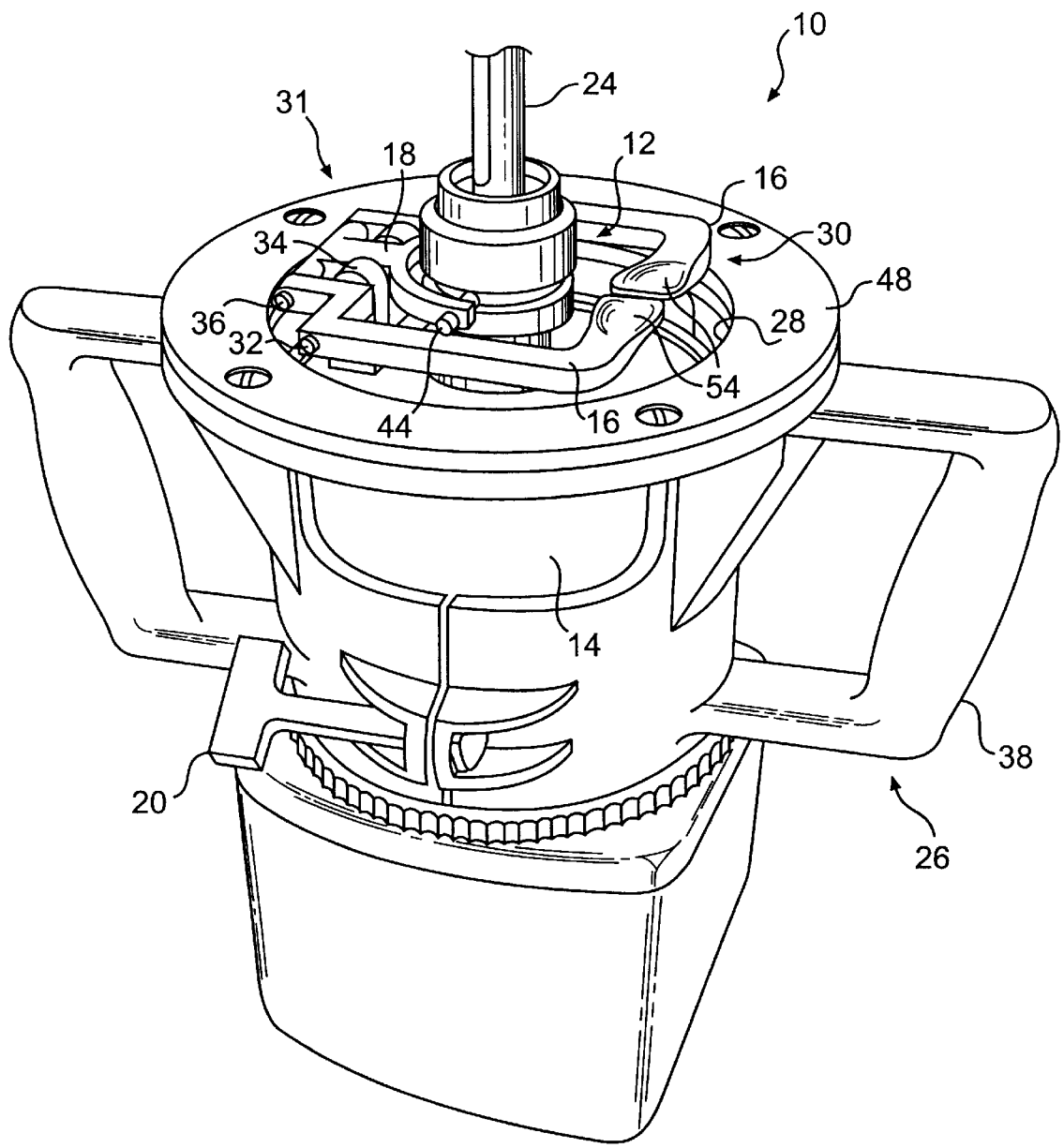
FIG. 1 is a perspective view of a power tool, for example a router, incorporating a remote chuck actuating device according to the invention.

Reference will now be made in detail to the presently preferred embodiments of the invention, one or more examples of which are illustrated in the drawings. Each example is provided by way of explanation of the invention, and is not meant as a limitation of the invention. For example, the features illustrated or described as part of one embodiment can be used on another embodiment to yield still a third embodiment. It is intended that the present invention include such modifications and variations as come within the scope and spirit of the present invention.

The present invention relates to power tools in general. For example, referring to the figures, the power tool 10 is illustrated as a conventional router. The particularly illustrated router is conventionally known as a fixed base router wherein a base member, shown generally as 26, is axially movable or positionable by rotating the base relative to a motor casing 14. This type of router is well known to those skilled in the art. Additional routers that are just as applicable (but not illustrated) include plunge type routers wherein the base member moves axially along guide rods or arms. This type of router is also well known to those skilled in the art. It should be appreciated that the present invention is not limited to any particular type of power tool, particularly any type of router. The invention has distinct advantages as it pertains to a fixed base router, as will be described in greater detail below, but this is not meant as a limitation of the invention. The present invention relates to any manner of power tool wherein it is desired to remotely actuate a chuck between gripping and release positions, including power drills, drill presses, lathes, milling machines, sanders, grinders, and the like.

Rotary power tool 10 according to the invention includes a chuck device, generally 12, for holding a tool bit 24. For example, in the embodiment of the power tool illustrated in the figures, chuck 12 holds a router bit 24. It should be appreciated that the type of chuck 12 is not particularly important to the invention. The present invention applies to any manner of chuck, for example the chucks described and illustrated in the patent and applications discussed above, wherein chuck 12 is actuated through axial movement relative to the chuck's body member or drive spindle 52 of tool 10. For example, chuck 12 may be actuated by axial movement of an outer sleeve member 22 relative to the drive spindle. There are a number of sleeve actuated chuck devices known to those skilled in the art and the particular operation of chuck device 12 is not necessary for appreciation or understanding of the present invention. Thus, chuck 12 will not be described in detail herein. One particular type of chuck for which the present invention is particularly applicable is illustrated and described in U.S. Pat. No. 5,810,366 and U.S. patent application Ser. No. 09/067,569, the entire disclosures of which are incorporated herein by reference in their entirety for all purposes.

The chuck illustrated in the present figures is similar to the chuck illustrated and described in pending application Ser. No. 09/067,569. With this particular type of chuck, an axial bore is defined by a plurality of longitudinally extending gripping segments separated by axially extending slits. An axially movable sleeve member surrounds the gripping segments. The gripping segments are compressed radially inward upon axial movement of the sleeve member to a gripping position to grip upon a tool shank inserted into the bore. The tool is released when the gripping segments move to a release position upon opposite axial movement of the sleeve.

A chuck 12 useful in the present invention includes some structure or mechanism, such as sleeve 22 having a circumferential groove 42, ridge, or other structure defined therein, for engagement with a first member 18, for example by way of engaging arms 44. Circumferential groove 42 may be formed as an integral component of sleeve 22 or, in an alternative embodiment, an additional outer sleeve or ring member defining the circumferential groove may be fitted onto sleeve member 22. This embodiment may be particularly useful in retro fitting the present invention to existing power tools and chucks.

Referring again to the figures in general, rotary power tool 10 includes a casing 14 housing the rotational drive spindle 52. Casing 14 is also the housing member for the drive spindle motor (not illustrated).

The invention includes a base member, generally 26, as is commonly understood in the art. The router illustrated in the figures is a fixed base router and base 26 is thus axially advanceable relative to casing 14 by rotating base 26 relative to the casing. Upon rotation of the base 26, working surface 48 of base 26 is axially positioned to establish a working position of tool 24 held by chuck device 12 relative to a work piece. The operation of the base member is conventional and well known to those skilled in the art. In general, an operator adjusts the base member by rotating handle 38 causing the base member to move axially relative to casing 14.

In an alternative conventionally known router, the base member moves axially on guide rods or arms without rotating relative to the router casing. The present invention is just as applicable to this type router.

The sleeve actuating device, generally 31, according to the invention is based on the principle of mechanical advantage wherein the actuation of lever 16 actuates chuck device 12. In this manner, sleeve actuating device 31 is operably engaged between casing 14 and chuck device 12 wherein movement of lever arm 16 is transferred as axial movement to chuck device 12 to move the chuck between the gripping and release positions. In the embodiment wherein sleeve actuating device 31 is incorporated on a fixed base router, the sleeve actuating device is disposed between the rotatable base member 26 and chuck 12 so as not to interfere with rotational movement of the base member 26 on casing 14.

In the embodiment wherein chuck device 12 incorporates an axially movable outer sleeve 22, first member 18 is engaged with outer sleeve 22 for moving chuck device 12 between the gripping and release positions. First member 18 is connected to pivot point 34 by pivot pin 32. First member 18 is pivotally mounted to pivot point 34 so that when an axial force is applied to first member 18 at least one engaging arm 44 will move chuck device 12 between the gripping and release positions.

Figure 2:
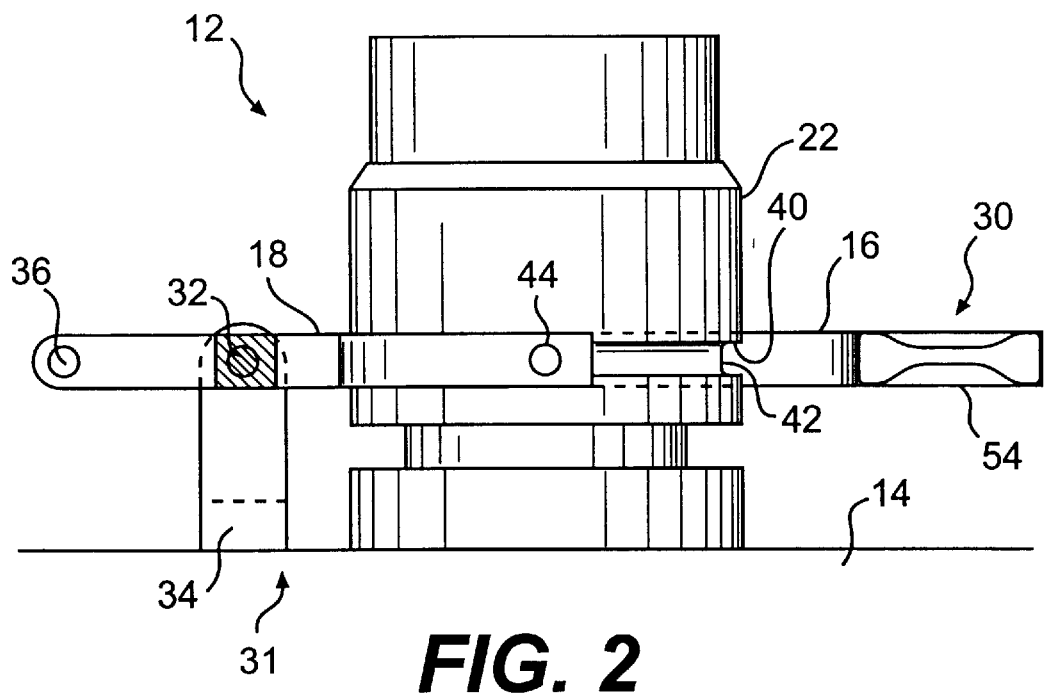
FIG. 2 is a partial cross-cut view of the device of FIG. 1 particularly illustrating the actuating device and the actuator member.
Figure 3:
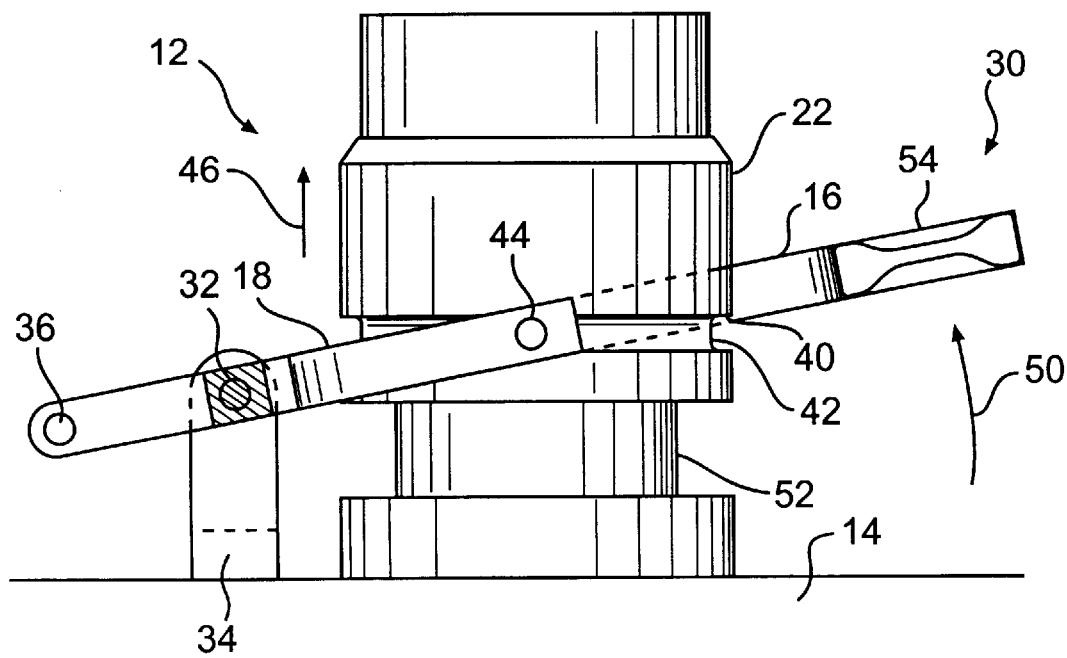
FIG. 3 is a partial cross-cut view of the device of FIG. 1 particularly illustrating the actuating device when the actuator member is moved from a first position to a second position.

In the embodiment illustrated in FIGS. 1–3, first member 18 is attached to an actuator member 30 at pin 36. Actuator member 30 is also connected to pivot point 34 at pivot pin 32. Sleeve actuating device 31 preferably should be constructed so as not to interfere with the operation of the movement of the base 26. As shown in FIG. 1, sleeve actuating device 31 is contained with the inner circumference 28 of base 26. This allows base 26 to be moved up and down without having to make any modifications to base 26.

To operate the device illustrated in FIGS. 1–3, bit 24 is inserted into chuck device 12 whereupon an operator moves actuator member 30, in this case lever arms 16 at their respective actuation points 54 in the direction of external force 50 causing rotation about pivot point 34 through pivot pin 32 which connects pivot point 34 with lever arm 16 in a plane generally parallel to a plane including the axis of the drive spindle. As lever arm 16 is moved in the direction of external force 50, pin 36 causes first member 18 to pivot about pivot point 34. As first member 18 pivots, engaging arms 44 engaged in groove 42 defined by shoulder 40 move sleeve member 22 in direction of arrow 46 thus engaging the tool bit 24 so that it cannot be dislodged during operation of the drive spindle. To release bit 24 an external force is applied in the direction opposite of external force 50. This causes lever arm 16 to move downward pivoting about pivot point 34 and through engagement of pin 36, causes first member 18 with engaging arms 44 to move sleeve member 22 in a direction opposite of arrow 46, thus releasing bit 24.

It should be appreciated that actuating member 30 and first member 18 can take on any manner of shape or configuration and serve the purpose of mechanically connecting or linking the axially movable chuck device 12 with casing 14. Any and all such constructions are within the scope and spirit of the invention.

It should be appreciated by those skilled in the art that various modifications and variations can be made in the present invention without from the scope and spirit of the invention. It is intended that the present invention include such modifications as variations which come within the scope of the appended claims and their equivalents.

What is claimed is:

1. A rotary power tool having a remotely actuated chuck device, said power tool comprising:

a casing housing a rotationally driven drive spindle;

a chuck device attached to an end of said drive spindle, said chuck device movable between a gripping position wherein said chuck device clamps upon a tool held therein, and a release position wherein said chuck device releases a tool held therein, an actuating device operably engaged with said chuck device to move said chuck device between said gripping and release positions, wherein said actuating device has a first member engaged with said chuck device and extending generally radially outward from said chuck device, said first member movable in a direction so as to engage and move said chuck device to said gripping position and to engage and move said chuck device to said release position, said actuating device further comprising an actuator member configured with said first member, extending generally perpendicular to the axis of the drive spindle, said actuator member operably connected to said first member so as to move pivotally in a plane generally parallel to a plane including the axis of the drive spindle to move said first member upon an external force being applied to said actuator member so that an operator can move said chuck device between said gripping and release positions at a location remote from said chuck device and drive spindle.

2. The rotary power tool as in claim 1, wherein said chuck device comprises an outer sleeve member that is axially movable between a gripping position wherein said chuck device clamps upon a tool held therein, and a release position wherein said chuck device releases a tool held therein.

3. The rotary power tool as in claim 2, wherein said actuator member comprises a lever arm, which is movable in a plane generally parallel to a plane in which said first member moves, operably connected to said first member and a pivot point, whereupon when said external force is applied to said lever arm, said lever arm operably engages said first member which thereby engages said chuck device.

4. The rotary power tool as in claim 1, wherein said rotary power tool is a router.

5. The rotary power tool as in claim 1, wherein said actuating device comprises at least one pivot point to which said actuator member is operably connected, wherein said pivot point is connected to the casing and is located at an end of said actuator member opposite an end to which an external force was applied.

6. The rotary power tool as in claim 1, wherein said actuator member is a lever.

7. The rotary power tool as in claim 6, wherein said lever comprises two actuation points.

8. The rotary power tool as in claim 7, wherein said actuation points are operated independently of each other.

9. A rotary power tool having a remotely actuated chuck device, said power tool comprising:

a casing housing a rotationally driven drive spindle;

a chuck device attached to an end of said drive spindle, said chuck device movable between a gripping position wherein said chuck device clamps upon a tool held therein, and a release position wherein said chuck device releases a tool held therein, an actuating device operably engaged with said chuck device to move said chuck device to said gripping position and to engage and move said chuck device to said release position, wherein said actuating device has a first member engaged with said chuck device and extending generally radially outward from said chuck device, said first member is movable in a direction so as to move said chuck device between said gripping position and said release position, said actuating device further comprising at least one pivotally mounted lever arm with an actuating point, wherein said lever arm extends generally perpendicular to the axis of the drive spindle and said lever arm is operably connected to said first member so as to move in a plane generally parallel to a plane including the axis of the drive spindle, and to move said first member upon an external force being applied to said lever arm so that an operator can move said chuck device between said gripping and release positions at a location remote from said chuck device and drive spindle.

10. The rotary power tool as in claim 9, wherein said rotary power tool is a router.

11. A rotary power tool having a remotely actuated chuck device, said power tool comprising:

a casing housing a rotationally driven drive spindle;

a chuck device attached to an end of said drive spindle, said chuck device movable between a gripping position wherein said chuck device clamps upon a tool held therein, and a release position wherein said chuck device releases a tool held therein, an actuating device operably engaged with said chuck device to move said chuck device between said gripping and release positions, wherein said actuating device has a first member engaged with said chuck device and extending generally radially outward from said chuck device, said first member movable in a direction so as to move said chuck device to said gripping position and said release position, said actuating device further comprising an actuator member configured with said first member, extending generally perpendicular to the axis of the drive spindle, said actuator member operably connected to said first member so as to move pivotally in a plane generally parallel to a plane including the axis of the drive spindle to move said first member upon an external force being applied to said actuator member so that an operator can move said chuck device between said gripping and release positions at a location remote from said chuck device and drive spindle, and comprising a base concentric on said casing, said base comprising an upper working surface for establishing a working position of said tool held by said chuck device relative to a workpiece, said base rotatably advanceable on said casing for adjusting said working position wherein said actuating device does not extend beyond an outer perimeter of said casing.

12. A rotary power tool having a remotely actuated chuck device, said power tool comprising:

a casing housing a rotationally driven drive spindle;

a chuck device attached to an end of said drive spindle, said chuck device movable between a gripping position wherein said chuck device clamps upon a tool held therein, and a release position wherein said chuck device releases a tool held therein, an actuating device operably engaged with said chuck device to move said chuck device between said gripping and release positions, wherein said actuating device has a first member engaged with said chuck device and extending generally radially outward from said chuck device, said first member movable in a direction so as to move said chuck device to said gripping position and said release position, said actuating device further comprising an actuator member configured with said first member, extending generally perpendicular to the axis of the drive spindle, said actuator member operably connected to said first member so as to move pivotally in a plane generally parallel to a plane including the axis of the drive spindle to move said first member upon an external force being applied to said actuator member so that an operator can move said chuck device between said gripping and release positions at a location remote from said chuck device and drive spindle, wherein said chuck device comprises an outer sleeve member that is axially movable between a gripping position wherein said chuck device clamps upon a tool held therein, and a release position wherein said chuck device releases a tool held therein, wherein said actuator member comprises a lever arm, which is movable in a plane generally parallel to a plane in which said first member moves, operably connected to said first member and a pivot point, whereupon when said external force is applied to said lever arm, said lever arm operably engages said first member which thereby engages said chuck device, and said lever arm extends generally perpendicularly to the axis of the spindle and is pivotally mounted relative to said casing so as to rotate in a plane generally parallel to said drive spindle axis and said first member is pivotally mounted to said casing thus imparting axial movement to said sleeve member, and further comprising a joint mechanism operationally disposed between said lever arm and said first member to convert movement of said lever arm to pivotal movement of said first member.

13. A rotary power tool having a remotely actuated chuck device, said power tool comprising:

a casing housing a rotationally driven drive spindle;

a chuck device attached to an end of said drive spindle, said chuck device movable between a gripping position wherein said chuck device clamps upon a tool held therein, and a release position wherein said chuck device releases a tool held therein, an actuating device operably engaged with said chuck device to move said chuck device between said gripping position and release positions, wherein said actuating device has a first member engaged with said chuck device and extending generally radially outward from said chuck device, said first member is movable in a direction so as to move said chuck device between said gripping position and said release position, said actuating device further comprising at least one pivotally mounted lever arm with an actuating point, wherein said lever arm extends generally perpendicular to the axis of the drive spindle and said lever arm is operably connected to said first member so as to move in a plane generally parallel to a plane including the axis of the drive spindle, and to move said first member upon an external force being applied to said lever arm so that an operator can move said chuck device between said gripping and release positions at a location remote from said chuck device and drive spindle, and wherein said actuating device is positioned within an inner perimeter of the base.

* * * * *